US010922114B2

(12) United States Patent
Zhu et al.

(10) Patent No.: US 10,922,114 B2
(45) Date of Patent: Feb. 16, 2021

(54) SYSTEM AND METHOD TO IMPROVE NESTED VIRTUAL MACHINE MONITOR PERFORMANCE

(71) Applicant: Intel Corporation, Santa Clara, CA (US)

(72) Inventors: Bing Zhu, Shanghai (CN); Kai Wang, Shanghai (CN); Peng Zou, Shanghai (CN); Fangjian Zhong, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 83 days.

(21) Appl. No.: 15/735,578

(22) PCT Filed: Dec. 12, 2016

(86) PCT No.: PCT/CN2016/109463
§ 371 (c)(1),
(2) Date: Jan. 31, 2019

(87) PCT Pub. No.: WO2018/107322
PCT Pub. Date: Jun. 21, 2018

(65) Prior Publication Data
US 2019/0155630 A1   May 23, 2019

(51) Int. Cl.
*G06F 9/46* (2006.01)
*G06F 9/455* (2018.01)
*G06F 9/30* (2018.01)

(52) U.S. Cl.
CPC ...... *G06F 9/45558* (2013.01); *G06F 9/30076* (2013.01); *G06F 9/30189* (2013.01);
(Continued)

(58) Field of Classification Search
CPC ........... G06F 99/45558; G06F 9/30076; G06F 9/45533; G06F 9/45558
See application file for complete search history.

(56) References Cited

U.S. PATENT DOCUMENTS 5,793,941 A * 8/1998 Pencis ................. G06F 12/0897
711/E12.043
9,454,497 B2   9/2016 Nakajima et al.
(Continued)

FOREIGN PATENT DOCUMENTS

CN   106201646 A   12/2016
WO   2016/012831 A1   1/2016

OTHER PUBLICATIONS

International Search Report and Written Opinion of International Application No. PCT/CN2016/109463 dated Sep. 13, 2017.
(Continued)

*Primary Examiner* — Camquy Truong
(74) *Attorney, Agent, or Firm* — Nicholson De Vos Webster & Elliott LLP

(57) ABSTRACT

A processing system includes a first register to store an invalidation mode flag associated with a virtual processor identifier (VPID) and a processing core, communicatively coupled to the first register, the processing core comprising a logic circuit to execute a virtual machine monitor (VMM) environment, the VMM environment comprising a root mode VMM supporting a non-root mode VMM, the non-root mode VMM to execute a virtual machine (VM) identified by the VPID, the logic circuit further comprising an invalidation circuit to execute a virtual processor invalidation (INVVPID) instruction issued by the non-root mode VMM, the INVVPID instruction comprising a reference to an INVVPID descriptor that specifies a linear address and the VPID and responsive to determining that the invalidation mode flag is set, invalidate, without triggering a VM exit event, a memory address mapping associated with the linear address.

22 Claims, 14 Drawing Sheets

(52) U.S. Cl.
CPC .............. *G06F 9/45533* (2013.01); *G06F 2009/45566* (2013.01); *G06F 2009/45583* (2013.01)

(56) References Cited

U.S. PATENT DOCUMENTS

| | | |
|---|---|---|
| 2005/0080934 A1 | 4/2005 | Cota-Robles et al. |
| 2011/0072428 A1 | 3/2011 | Day, II et al. |
| 2013/0232490 A1* | 9/2013 | Moriki ............... G06F 9/45533 718/1 |

OTHER PUBLICATIONS

European Search Report and Search Opinion, EP App. No. 17202655.1, dated May 2, 2018, 08 pages.
Intel, "Intel® 64 and IA-32 Architectures Software Developer's Manual", System Programming Guide, vol. 3 (3A, 3B, 3C & 3D), May, 2020, 1772 pages.
International Preliminary Report on Patentability, PCT App. No. PCT/CN2016/109463, dated Jun. 27, 2019, 5 pages.

* cited by examiner

US 10,922,114 B2

SYSTEM AND METHOD TO IMPROVE NESTED VIRTUAL MACHINE MONITOR PERFORMANCE

TECHNICAL FIELD

The present disclosure relates to processors and, more specifically, to a processor including circuit implementation of instructions that improves the performance of nested virtual machine monitors (VMMs).

BACKGROUND

A computing device may include one or more processing cores in one or more processors (such as central processing units (CPUs)) for executing instructions and a memory device (such as random-access memory (RAM)) for storing instructions and data associated with executing tasks (including user application and system application such as the kernel of an operating system) on the one or more processing cores. Instructions of each application program may access the memory using virtual addresses (or linear addresses) in a virtual memory address space. A memory management unit may use a page table to translate virtual addresses into physical addresses of the memory.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
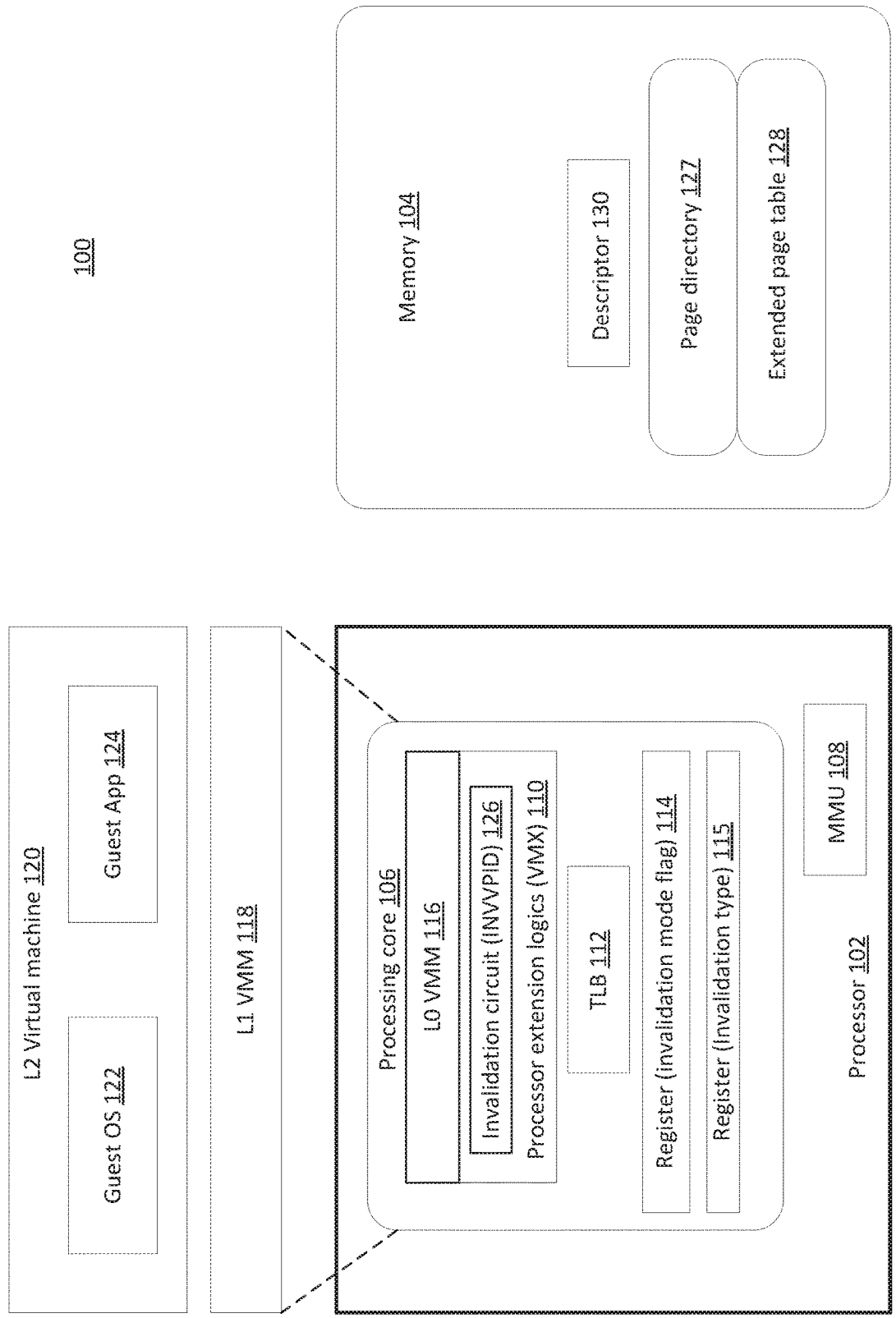
FIG. 1 illustrates a processing system according to an embodiment of the present disclosure.

A processor may execute a virtual machine monitor (VMM) that may support multiple virtual machines (VMs). The VMM, at initiating the VMs, may assign a unique identifier (call virtual processor identifier (VPID)) to each VM. Each VM may include a guest operating system and run guest software applications. Certain hardware processor architectures provide mechanism to support memory address mappings. In this disclosure, a guest application running on a VM is associated with linear addresses in a guest virtual address (GVA) space. The guest operating system (OS) may translate a linear address to a guest physical address associated with the VM. A memory management unit (MMU) associated with a processor may translate the GPA to a host physical address (HPA) referencing the memory of the host machine. Thus, there may be three types of mappings, including a linear address mapping directly to an HPA, a guest-physical mapping from a GPA to an HPA, and a combined mapping that combines the two mappings to translate from a linear address to a GPA and from the GPA to the HPA. For convenience of discussion, this disclosure refers both the linear address mapping and the combined mapping as memory address mappings.

The processor may include a control register to store the base address to a page directory. Entries of the page directory may store the linear address mappings. The VMM may employ an auxiliary page table (referred to as the extended page table (EPT)) to translate guest physical addresses (GPAs) used by a guest operating system of a VM to the host physical addresses (HPAs) for accessing the memory of the host machine. The guest physical address space may be organized as pages (referred to as guest memory pages) of a determined size (e.g., 4 KB). The guest memory pages may be identified by identifiers (referred to as GPA page numbers). The HPA space may be organized as memory frames of a determined size (e.g., 4 KB). The memory frames may be identified by identifiers (referred to as memory frame numbers).

In some implementations, a processor may include a logic circuit (referred to as processor extension logic) implemented to support execution of a set of virtualization instructions (e.g., virtual-machine extension (VMX)). Hardware-assisted virtualization features of the processor allow executing, at an elevated privilege level, a VMM that acts as a host and has the full control of the processor and other platform hardware. The VMM presents a virtual machine with an abstraction of one or more virtual processors and other platform resources. The virtual machine may use the VMM-facilitated interface to the processors, memory, storage, graphics, and I/O provided by the platform. However, the VMM retains selective control of the platform resources.

Transition from the VMM execution mode (also referred to as VMX root operation in certain processor architectures) to the guest execution mode (also referred to as VMX non-root operation) is referred to as a VM entry and may be performed by executing a special Instruction Set Architecture (ISA)-dependent instruction (e.g., VMLAUNCH/VMRESUME or VMRUN instructions). The reverse transition, i.e., from the guest execution mode to the VMM execution mode is referred to as a VM exit and is initiated by the processor to switch the execution mode to the VMM execution mode in response to detecting one of the triggering events (such as an attempt to execute a privileged instruction or to access a protected memory address).

Thus, when executed in the guest execution mode, certain instructions and events may trigger VM exits to the VMM, thus allowing the VMM to retain the full control of processor resources and prevent the virtual machine from executing certain privileged operations.

The VMX may provide support for one or more virtualization environments. A virtual environment includes the combination of one or more VMMs and the processor supporting these VMMs.

During execution of a guest application on a VM, the guest operating system of the VM may provide a linear mapping from a linear address to a HPA. A memory management unit (MMU) associated with the processor may use an EPT to provide the guest-physical mapping from the GPA to corresponding HPA. The MMU can be part of the processor or a chipset communicatively coupled to the processor. The processor may form a combined mapping from the linear address to the GPA and then to the HPA. To speed up the performance of future mappings, processing core 106 may, after performing the current memory address mappings (either the linear mapping or the combined mapping), store a copy of the memory mappings in a buffer (referred to as a translation lookaside buffer (TLB)). The TLB may include multiple TLB entries. A TLB entry may include a first field to store a memory address mapping, a second field to store the access right flags (e.g., R, W, X), and a third field to store a validity flag indicating the validity of the TLB entry.

In some implementations, the TLB is associated with a context. A context switch occurs responsive to transitioning from a first guest application to a second guest application. The context may be associated with the VPID. The Level-1 VMM may modify the EPT. Responsive to the modification of the EPT, the processor may need flushing the corresponding TLB entries from the TLB. The TLB flushing may be accomplished by executing a TLB flushing instruction. When multiple VMs are executing on a host including the processor, the VPIDs are stored in a field of TLB entries for identifying the association between a TLB entry and a VM.

In some implementations, the VMX instruction set may include a virtual processor invalidation (INVVPID) instruction that can invalidate memory address mappings (either linear mapping or combined mapping) associated with a linear address and flush cached paging data structures such as TLB entries associated with a VPID. In one implementation, the invalidation can be achieved by setting a validation flag associated with a memory address mapping to the invalid status. The INVVPID instruction may be issued by a guest application running on a VM or by the VMM. In some implementations, the execution of INVVPID instruction from a guest application causes the VM to exit. When the INVVPID instruction is issued from Level-0 VMM, the processor may also invalidate the linear mappings or combined mappings associated with the VPID.

The VMM environment can be implemented to include nested VMMs. The nested VMMs may include a Level-0 VMM that executes on the processor at an elevated privileged level, and a Level-1 VMM that is supported by an operating system of the host. The Level-1 VMM may further support Level-2 guest VMs). Further, VMX operations are divided into VMX root mode that are controlled by the Level-0 VMM and VMX non-root mode that are controlled by Level-1 VMMs and guest software (e.g., VMs and guest OS). Therefore, there are two kinds of VMX transitions: transitions into a VMX non-root operation (referred to as a VM entry event) from root operations, and transitions to VMX root operation (referred to as a VM exit event) from a VMX non-root operation. Thus, Level-1 VMM runs under the non-root mode, and the Level-0 VMM runs under the root mode. The Level-0 VMM (e.g., the Xen platform) can be implemented on the bare-metal of the host by directly executing the virtualization instructions (e.g., VMX instructions). In contrast, the Level-1 VMM (e.g., a KVM VMM on top of the Xen) may run on top of the host operating system, thus running under the VMX non-root mode. The Level-0 VMM may provide support to the Level-1 VMM by translating the instruction issued by the level-1 VMM requests to the Level-0 VMM. These requests are fulfilled by the processor executing VMX instructions as defined in the virtualization instruction set.

A Level-1 VMM may issue the INVVPID instruction responsive to modifying the EPT for its Level-2 guest. In some implementations of VMX, the issuance of the INVVPID instruction by the Level-1 VMM in the non-root mode unconditionally causes the processor to trigger the VM exit event. For example, the Level-1 VMM may execute the INVVPID instruction responsive to modifying the EPT for its Level-2 guest. The Level-0 VMM may receive the request for invalidating memory address mappings according to an invalidation type (the invalidation types are described in the paragraphs 0041 of the disclosure). In these implementations, the Level-0 VMM may invalidate, without regard to the invalidation type specified by the Level-1 VMM, all memory address mappings associated with all VPIDs except for some machine reserved VPIDs (e.g., VPID 0000h reserved for the level-0 VMM). Thus, responsive to the execution of the INVVPID instruction, the processor may trigger the VM exit event and also causes the Level-0 VMM to flush all TLB entries associated with all VPIDs (except for some reserved VPIDs). This may cause unnecessary occurrences of VM exit events. For example, of the number of VM exit events may be at least 20% higher than necessary. The higher number of VM exit events deteriorates the processor performance.

Embodiments of the present disclosure address the above-noted and other deficiencies by implementing an INVVPID instruction that does not automatically trigger the VM exit event. In particular, the embodiments include an implementation of the INVVPID instruction that, when executed by a Level-1 VMM (under the non-root mode) supported by Level-0 VMM (under the root mode), is to invalidate the memory address mappings without trigging a VM exit event. The INVVPID instruction may produce different outcomes based on an invalidation type specified by the Level-1 VMM. Thus, embodiments of the present disclosure reduce the overhead associated the execution of the INVVPID instruction by the Level-1 VMM and utilize the TLB more efficiently by eliminating the need to invalidate all TLB entries.

FIG. 1 illustrates a processing system 100 according to an embodiment of the present disclosure. As shown in FIG. 1, processing system 100 (e.g., a system-on-a-chip (SOC)) may include a processor 102 and a memory device 104 communicatively coupled to processor 102. Processor 102 may be a hardware processing device such as, for example, a central processing unit (CPU) or a graphic processing unit (GPU) that includes one or more processing cores 106 to execute software applications. Processor 102 may further include one or more processing cores 106 and a memory management unit (MMU) 108 to perform memory address translation on behalf of processing cores 106.

Figure 6:
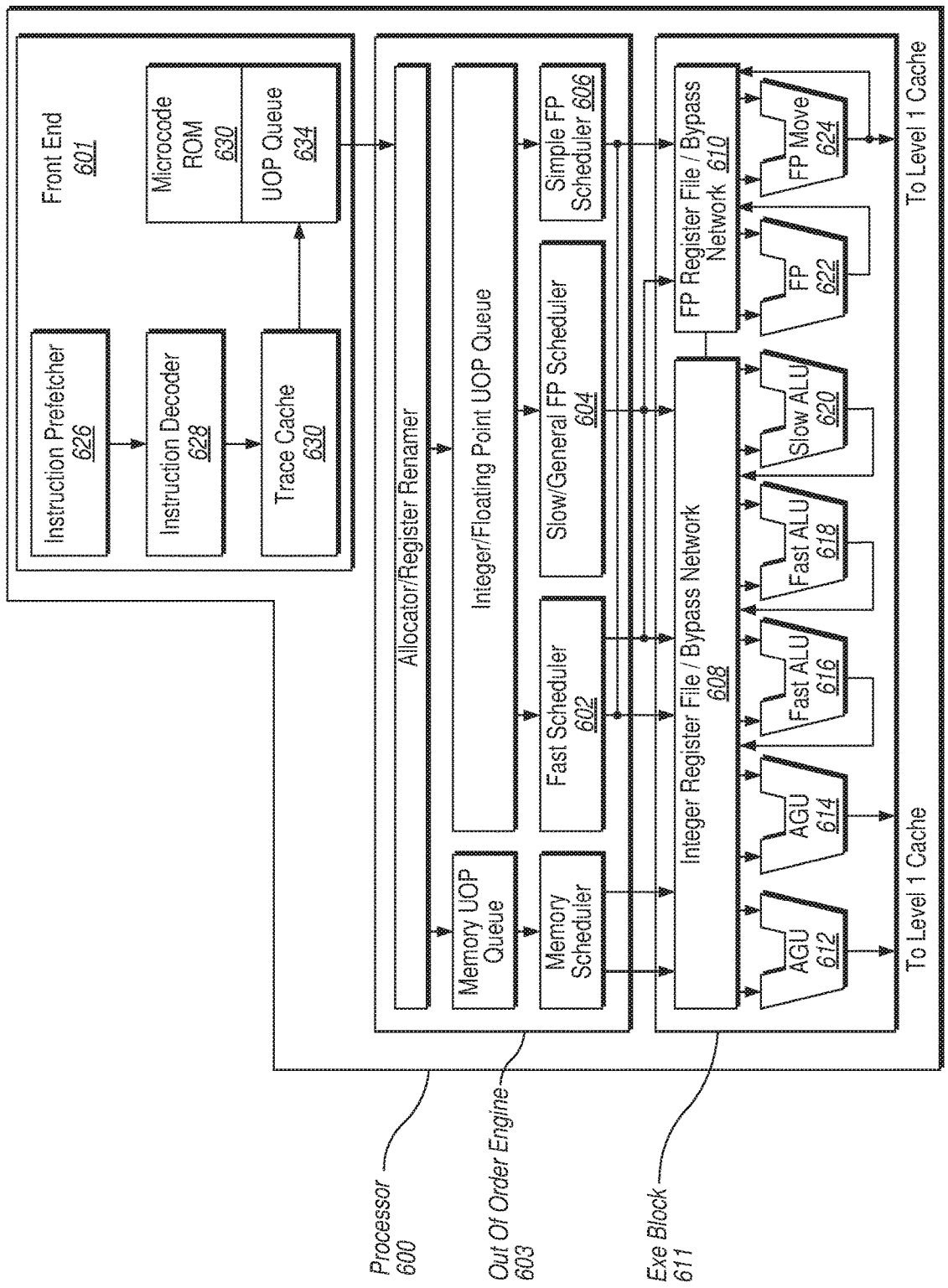
FIG. 6 illustrates a block diagram of the micro-architecture for a processor that includes logic in accordance with one embodiment of the disclosure.
Figure 7:
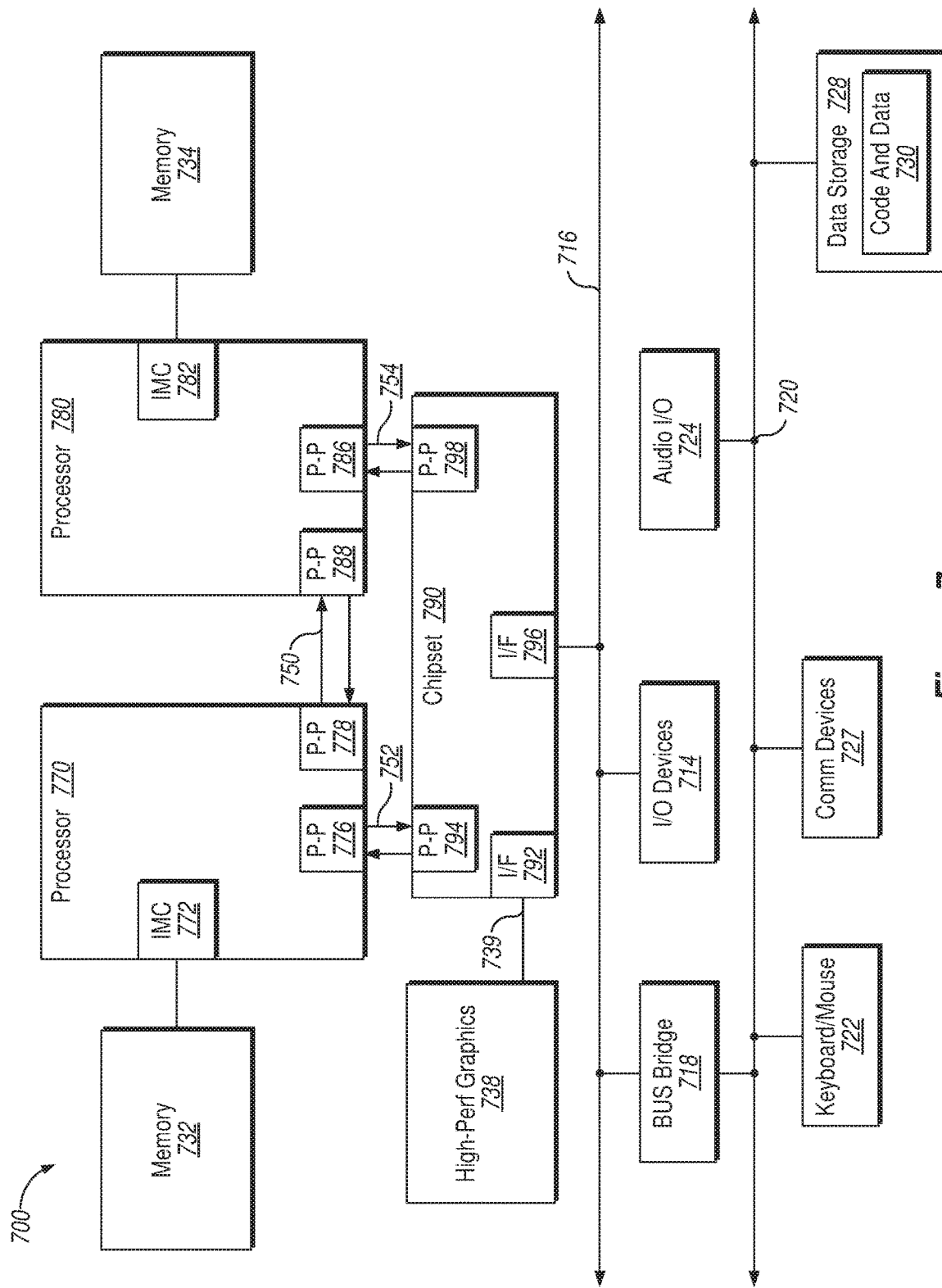
FIG. 7 is a block diagram illustrating a system in which an embodiment of the disclosure may be used.

Processing cores 106 in various implementations may be provided by in-order cores or out-or-order cores. In an illustrative example, processing core 106 may have a micro-architecture including processor logic and circuits used to implement an instruction set architecture (ISA). Processors 102 with different micro-architectures can share at least a portion of a common instruction set. For example, the same register architecture of the ISA may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file), as illustrated by FIGS. 6-7.

Processor 102 may further include processor extension logic circuit 110 to implement extended instruction sets to support additional functionalities of processor 102. In one embodiment, processor extension logic circuits 110 may support execution of a set of virtualization instructions (e.g., virtual-machine extension (VMX)) to provide support for one or more virtualization environments residing on host. The VMX may provide processor-level support for virtual machines.

In one embodiment, the VMX may include instructions to generate a Level-0 virtual machine monitor (VMM) 116 that runs under the VMX root mode. Level-0 VMM 116 may support a Level-1 VMM 118 that runs on top of an operating system of the host machine. Level-1 VMM 118 is a host program that runs under the non-root VMX mode. Level-0 VMM 116 and Level-1 VMM together constitute a nested VMM environment that supports one or more virtual machines (VMs) 120 to run on the host. VMM 118 may create and run virtual machines (VMs) 120. Additionally, Level-0 VMM may also support Level-1 guest programs such as a Level-1 VM (not shown).

VMs 120 may behave like a hardware computing device to end users. For example, VMs 120 may each include a virtual processor (not shown) that emulates a hardware processor. VMM 118 may assign a VPID to the virtual processor at the creation of a VM, and thus VM can be uniquely identified by the VPID. The virtual processor associated with VMs 120 may support a respective guest operating system (guest OS) 122. Guest applications 124 may run within the environments of guest operating systems 122. Guest operating systems 122 (including kernels) can include a number of guest-OS components (or kernel components) to provide a number of services to guest applications 124, including such as, for example, scheduler, process management, I/O management, memory management, drivers (e.g., file system and volume drivers, mass storage drivers, and bus drivers), and code integrity management services.

Guest OS 122 may provide a scheduling service (scheduler) to the execution of guest application 124, and the scheduling service may allow the application's execution being carried out in threads. A thread of execution is the smallest sequence of program instructions that can be managed independently a task scheduler of an OS (e.g., the guest OS 122). The execution of a thread is carried out by a logical processor. The number of logical processors associated with a VM 120 may define the maximum number of threads that the guest OS 122 can handle. All these logical processors, when executing threads associated with the program code of guest application 124, may share a guest physical address space that may be mapped to a physical address space of memory 104 by memory management unit 108.

VMs 120 include guest OS 122 and guest application 124 may access memory 104 through the memory address mappings. Guest OS 122 may construct a guest virtual address (GVA) space for a guest application 124 and map the GVA space to a corresponding guest physical address (GPA) space for VM 120. GPA space may be organized according to guest memory pages that each has a determined size. Each one of the guest memory pages in the GPA space may be associated with an identifier (guest memory page number) that uniquely identifies the guest memory page. In one embodiment, the GPA space may be identical to the host physical address space. Thus, linear mappings stored in page directory 127 may be used to translate a linear address to an HPA. Memory management unit 108 may map a memory address in the GPA space associated with VM 120 to a memory address in the host physical address (HPA) space of the memory 104 of a host using an extended page table (EPT) 128. As discussed above, a linear address may be directly mapped to a HPA via a linear mapping, or indirectly mapped to a GPA and then to a HPA via a combined mapping.

The EPT 128 may include multiple entries referred to as EPT entries (EPTEs). An EPTE may store a memory address mapping from a GPA space to an HPA, and a plurality of access right flags associated with these memory frames referenced by the GPA. Each EPTE also includes a validity flag that, when set, indicates that EPTE is valid, and when disabled, indicates that the EPTE is invalid. The EPT entries may further include a field to store VPID. The VPID may be used to identify the associations between EPT entries and their corresponding VMs.

During execution of a guest application 124, responsive to a request to access memory 104, memory management unit 108 may map a GPA associated with VM 120 to the corresponding HPA so that the application can access memory 104. MMU 108 may perform the memory address translation based on the memory address mappings stored in EPT 128. EPT may be stored in memory 104. The EPT is used in the guest-physical mapping alone or in the guest-physical mapping portion of the combined mapping. To facilitate fast retrieval of memory address mappings (i.e., the linear mapping and the combined mapping), processing core 106 may include a translation lookaside buffer (TLB) 112 to cache these memory address mappings. In one embodiment, TLB 112 may be provided in a cache (e.g., L1-L3 cache or the last-level cache (LLC)) of processor 102. The content of the cache can be accessed faster than memory 104. Thus, when Level-1 VMM 118 running under the non-root mode changes the memory address mapping (e.g., the linear mapping or the combined mapping) for a Level-2 guest supported by the Level-1 VMM, the VMM 118 may need to issue the INVVPID instruction to request Level-0 VMM running under the root mode to invalidate the memory address mappings and flush the TLB 112 associated with the current context.

Embodiments of the present disclosure provide a processor including an invalidation circuit to implement an INVVPID instruction 126. During execution of the INVVPID instruction, the processor may make a determination of whether to trigger the VM exit event and/or to flush all TLB entries based on an invalidation type specified by Level-1 VMM 118. The execution of the INVVPID instruction does not automatically trigger the VM exit event and flush all TLB entries if an invalidation mode flag is set, thus improving the performance of processor 102. The performance is improved due to reduced occurrences of VM exit events and avoidance of flushing all TLB entries by re-using still valid TLB entries (e.g., those not associated with the VPID).

As shown in FIG. 1, processor extension logic (VMX) 110 may include a logic circuit to implement the INVVPID instruction 126. In one embodiment, the INVVPID instruction 126 may include two operation modes that may be selectively enabled based on a control flag (referred to as an "invalidation mode flag") stored in a register 114. When the invalidation mode flag is set (e.g., to value of one ("1")), the INVVPID instruction 126 issued by Level-1 VMM 118 does not automatically trigger a VM exit event (and flush all TLB entries). When the invalidation mode flag is not set (e.g., to value of zero ("0")), the INVVPID instruction 126 issued by Level-1 VMM 118 behaves as before—namely, triggering the VM exit event and flushing all TLB entries by Level-0 VMM 116.

In one embodiment, register 114 can be a control register (e.g., a machine-specific register (MSR)) used for storing data items of a VM control structure (VMCS). Processor 102 of the host may control the behaviors of VMs and the non-root operation and VMX transitions using the VMCS. A VMCS is a data structure (in the HPA space) containing operational states and control fields of the guest VM 120, VMMs, and the host machine. The operational states may include states of control registers, instruction pointers, and stack pointers. The operational states define a VM context associated with the VM 120. Access to the VMCSs is managed through a VMCS pointer (one per virtual processor or logic processor) stored in registers. VMM 118 may configure a VMCS using VMX instructions (e.g., VMREAD, VMWRITE, and VMCLEAR). A VMCS is associated with a currently-running VM with respect to one virtual processor.

Figure 13:
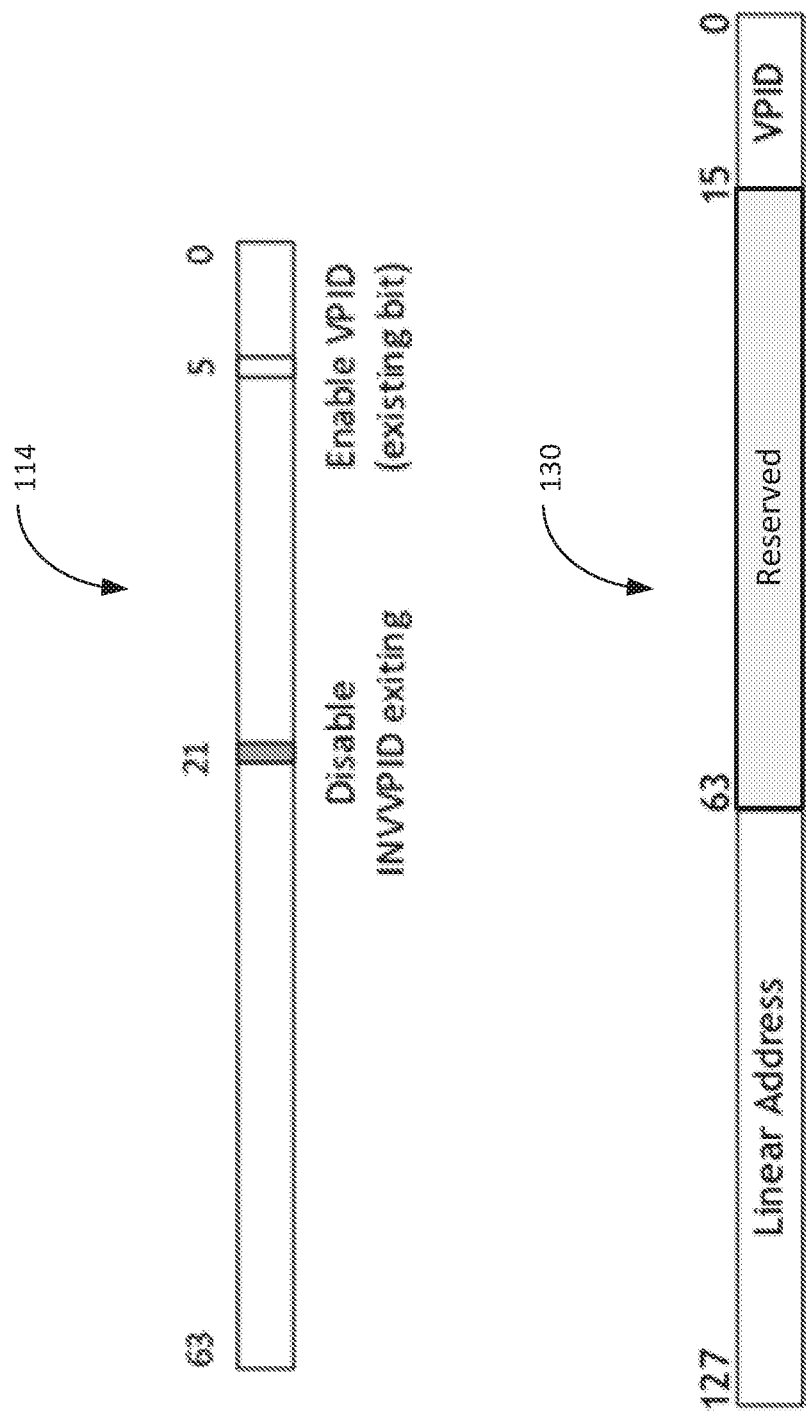
FIG. 13 illustrates the content stored in control registers according to an embodiment of the present disclosure.

FIG. 13 shows the VMCS data item stored in register 114 according to an embodiment of the present disclosure. As shown in FIG. 13, register 114 is 64-bit long and may include two 1-bit control flags. A first control flag (shown as an example at bit 21) is the invalidation mode flag associated with the enabling of the INVVPID instruction as described in this disclosure. If the first control flag is not set (or clear), the execution of the INVVPID instruction by Level-1 VMM 118 is the same as before—i.e., triggering the VM exit event and optionally flushing all TLB entries. If the first control flag is set, the execution of the INVVPID instruction by Level-1 VMM 118 is modified. The execution of the INVVPID instruction can avoid triggering the VM exit event; and its behavior depends on an invalidation type specified by Level-1 VMM 118. Thus, responsive to identifying the INVVPID instruction issued by Level-1 VMM 118, processing core 106 of processor 110 may first check the first control flag stored in register 114 to determine how to execute the INVVPID instruction.

A second control flag (shown as an example at bit 5) is the VPID control flag. When the VPID control flag is set (e.g., value of one ("1")), the execution of the INVVPID instruction 126 by Level-0 VMM 116 may further include checking a VPID field in an INVVPID descriptor and determining whether to trigger the VM exit event based on the value stored in the VPID field. In one embodiment, the first control flag and the second control flag may be related. For example, the first control flag can be set only if the second control flag has already been set.

INVVPID instruction 126 may include a memory operand and a register operand. The memory operand may reference a memory location that stores an INVVPID descriptor 130. INVVPID descriptor 130 is a data entry of defined size (e.g., 128 bit. FIG. 13 shows an INVVPID descriptor 130 according to an embodiment of the present disclosure. As shown in FIG. 13, INVVPID descriptor 130 may include a linear address and VPID, thus specifying which linear address associated with VM is to be invalidated.

The register operand may reference a control register 115 that stores a value representing an invalidation type. The invalidation type may be set by Level-0 VMM 116 and determine the INVVPID instruction operates if it is called by the root-mode VMM 116. In one embodiment, there are four defined invalidation types. The first type is the "individual-address invalidation" type (represented by a value of zero ("0")). Under the first type, processor 102 is to invalidate memory address mappings (both linear mappings and combined mappings) associated with the VPID. The INVVPID descriptor associated with the instruction may include a linear address. The execution of the INVVPID instruction may invalidate the memory address mappings associated with the linear address specified in the INVVPID descriptor.

The second type is the "single-context invalidation" type (represented by a value of one ("1")). Under the second type, processor 102 is to invalidate all memory address mappings (both linear mappings and combined mappings) associated with the VPID as specified in the INVVPID descriptor.

The third type is the "all-context invalidation" type (represented by a value of two ("2")). Under the third type, processor 102 is to invalidate all memory address mappings (both linear mappings and combined mappings) associated with all VPIDs except for the reserved VPID for the Level-0 VMM (e.g., 0000H).

The fourth type is the "single-context-retaining-global invalidation" type (represented by a value of three ("3")). Under the third type, processor 102 is to invalidate all memory address mappings (both linear mappings and combined mappings) associated with the VPID as specified in the INVVPID descriptor, but processor 102 is not required to invalidate information used for global translation. Global translations are those mappings that are shared by both the processor context and the VM context, indicating that these mappings remain in cache after a VM context switch.

Figure 2:
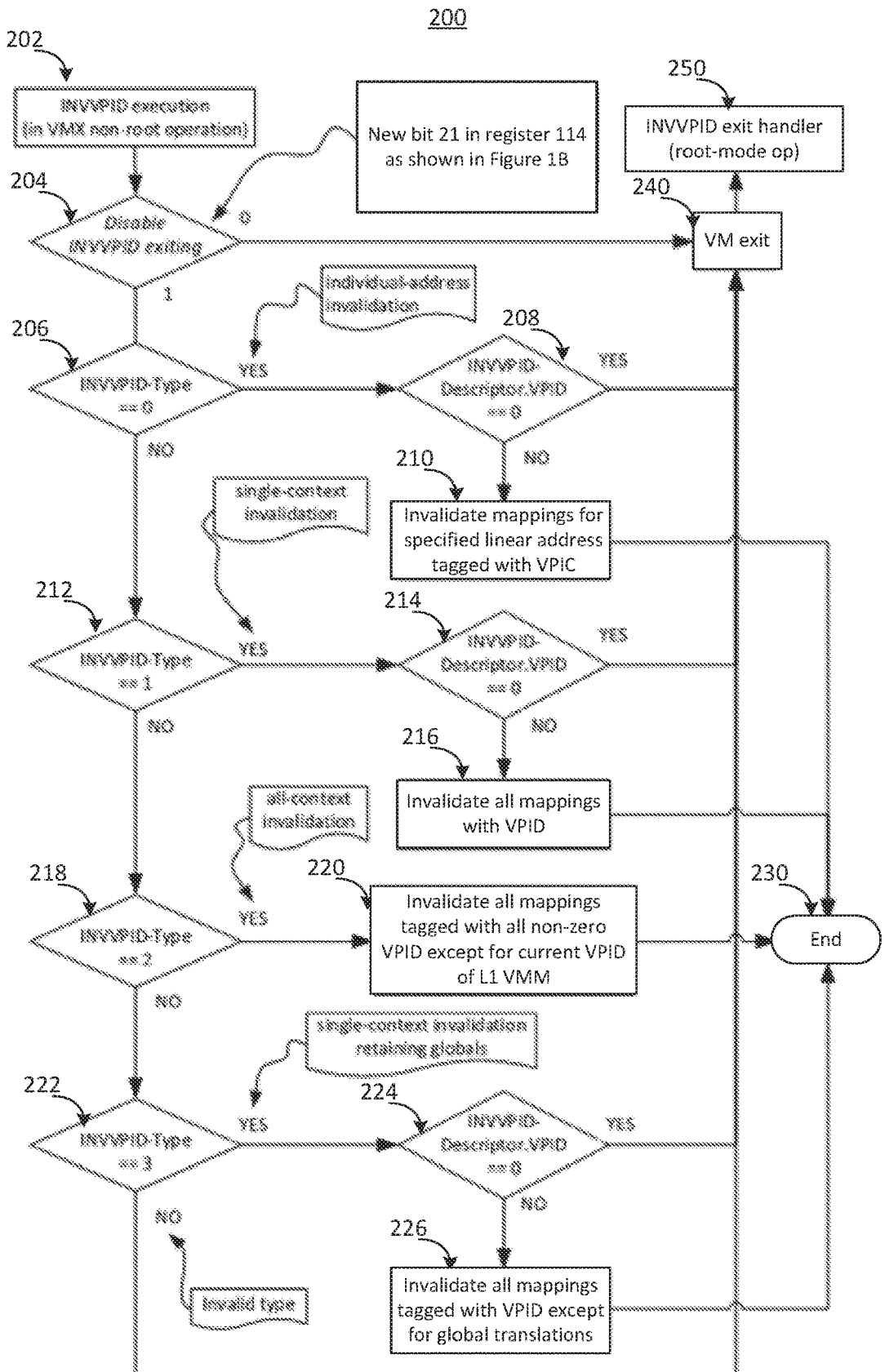
FIG. 2 illustrates the execution process of an virtual processor invalidation (INVVPID) instruction issued by a Level-1 VMM according to an embodiment of the present disclosure.

FIG. 2 illustrates the execution process 200 of an INVVPID instruction issued by a Level-1 VMM according to an embodiment of the present disclosure. At 202, Level-1 VMM running under the non-root mode may issue an INVVPID instruction. The INVVPID instruction may specify a memory operand to reference an INVVPID descriptor and a register operand to reference a register to store an invalidation type. The INVVPID descriptor may specify a linear address and a VPID associated with the linear address. The invalidation type can be one of the four defined types described above.

The Level-0 VMM running under the root mode may receive the request from the Level-1 VMM to execute the INVVPID instruction implemented in the invalidation circuit of the VMX instruction set. At 204, responsive to receiving the request, processor may first read a first control register (e.g., register 114 as shown in FIG. 1) to determine whether the invalidation mode flag is set (e.g., bit 21 of register 114 as shown in FIG. 1). If the invalidation mode flag is not set (e.g., value of "0"), at 240, processor may trigger a VM exit event. At 250, the Level-0 VMM may call a VM exit instruction (e.g., VMEXIT) and invalidate all memory mappings and flush all TLB entries without regard to the VPIDs (except for the reserved VPID).

If the invalidation mode flag is set (e.g., value of "1"), at 206, the Processor may read a second control register (e.g., register 115 as shown in FIG. 1) to determine the invalidation type. If the invalidation type is determined to be the "individual-address invalidation" type (type value="0"), at 208, the Processor may read the VPID field of the associated INVVPID descriptor to determine is the VPID value is zero. If the VPID value is zero, at 240, Processor triggers the VM exit event. If the VPID value is non-zero, at 210, Processor may invalidate the memory address mappings (linear mappings and combined mappings) associated with the linear address and the VPID as specified in the INVVPID descriptor. The invalidation may include flushing the TLB entries associated with the invalidated memory address mappings. The invalidation ends at 230 without triggering the VM exit event.

Alternatively, at 212, the Processor may determine the invalidation type to be the "single-context invalidation" type (type value="1"). At 214, the processor may read the VPID field of the associated INVVPID descriptor to determine is the VPID value is zero. If the VPID value is zero, at 240, processor triggers the VM exit event. If the VPID value is non-zero, at 216, processor may invalidate all memory address mappings associated with VPID which is specified in the INVVPID descriptor, and flush TLB entries associated with these invalidated memory address mappings. The invalidation ends at 230 without triggering the VM exit event.

Alternatively, at 218, the Processor may determine the invalidation type to be the "all-context invalidation" type (type value="2"). At 220, Processor may invalidate all memory address mappings and flush TLB entries associated with these invalidated memory address mappings except for those memory address mappings associated with the reserved VPID and the VPID of the Level-1 VMM. In one embodiment, the VPID of the Level-1 VMM is assigned by the processor. The invalidation ends at 230 without triggering the VM exit event.

Alternatively, at 222, the Processor may determine the invalidation type to be the "single-context-retaining-global translations invalidation" type (type value="3"). At 224, the Processor may read the VPID field of the associated INVVPID descriptor to determine whether the VPID value is zero. If the VPID value is zero, at 240, Processor triggers the VM exit event. If the VPID value is non-zero, at 226, Processor may invalidate all memory address mappings associated with the VPID which is specified in the INVVPID descriptor except for global address translations, and flush TLB entries associated with these invalidated memory address mappings. The invalidation ends at 230 without triggering the VM exit event.

Figure 3:
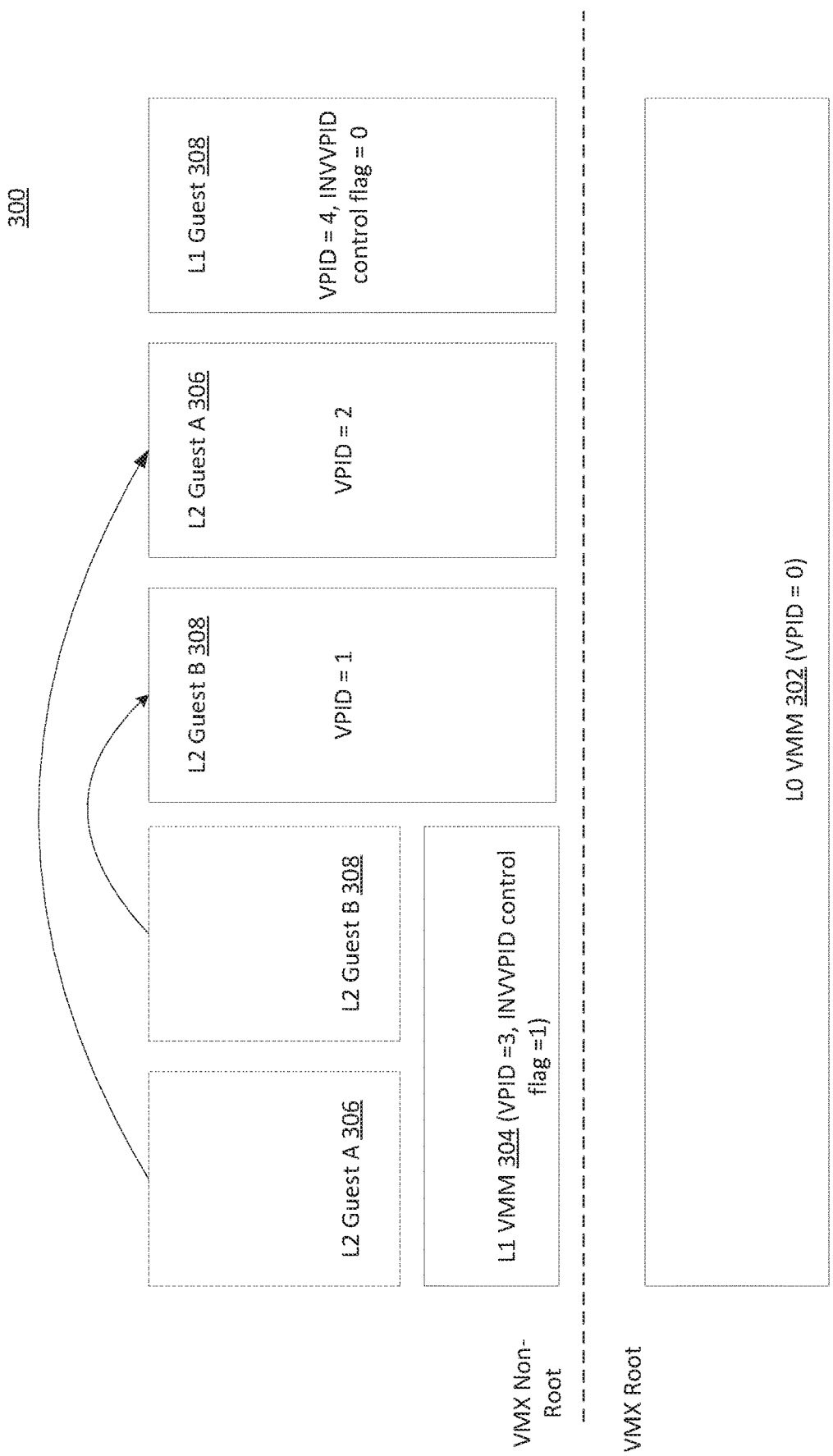
FIG. 3 illustrates an example VMM environment according to an embodiment of the present disclosure.

FIG. 3 illustrates an example VMM environment 300 according to an embodiment of the present disclosure. As shown in FIG. 3, VMM environment 300 may include a VMX root operation portion and a VMX non-root operation portion. The VMX root operation portion may include the Level-0 VMM 302. In this embodiment, Level-0 VMM is assigned with a reserved VPID value (e.g., VPID=0000) designated by the hardware processor configuration. The VPID setting of Level-0 VMM is invisible to other components (e.g., Level-1 VMMs or guest VMs). The VMX non-root portion may include Level-1 VMMs 304 and Level-1 guest VMs 308. As shown in FIG. 3, Level-0 VMM 302 may launch L1 VMM 304 and further configure the invalidation mode flag stored in a control register (e.g., register 114 as shown in FIG. 1). In this example, Level-0 VMM 302 may enable the invalidation mode flag by setting the value to "1." Level-0 VMM 302 may enable the VPID control flag in the register, and assign a unique VPID value (VPID=3) to the Level-1 VMM 304. In addition to the Level-1 VMMs 304, Level-0 VMM 302 may also launch Level-1 guest VMs 308. In this example, Level-0 VMM 302 may disable the invalidation mode flag by setting the value to "0." Level-0 VMM 302 may assign a unique VPID value (VPID=4) to the Level-1 guest VM 308.

Level-1 VMM 304 may further launch Level-2 guest VMs 306, 308. Guest VMs 306, 308 are directly managed by Level-1 VMM 304. For example, Level-1 VMM 304 may assign the VPIDs (1 and 2) to Level-2 guest VMs. The execution of guest VMs 304, 306, however, are carried out by VMX instructions on the bare-metal processor.

Level-0 VMM 302 assigns unique VPID values to Level-1 virtualization applications. Since the Level-2 virtualization applications are assigned by Level-1 VMMs 304, Level-1 VMMs 304 may assign VPIDs duplicating the existing VPIDs set by Level-0 VMM 302. Embodiments of the present disclosure provide solutions to avoid duplicating VPIDs. The solutions may provide mechanism for Level-1 VMMs 304 to notify Level-0 VMM 302 each time Level-1 VMMs 304 generates a VPID for its guest VMs 306, 308. Responsive to receiving the VPID generated by Level-1 VMMs 304, the Level-0 VMM 302 may compare the VPID with existing VPIDs known to the Level-0 VMM 302 to determine whether the newly generated VPID is a duplicate of an existing VPID. If Level-0 VMM 302 determines that the VPID newly generated by Level-1 VMM 304 is the same as an existing VPID generated by Level-0 VMM 302, Level-0 VMM 302 may re-assign a new unique VPID to replace the existing VPID without changing the VPID generated by Level-1 VMMs 304. To achieve this, prior to re-assigning the new VPID, Level-0 VMM 302 may execute an INVVPID instruction to invalidate all memory address mappings tagged with the duplicated VPID.

In one embodiment, Level-0 VMM 302 may be responsible for setting a VMWRITE bitmap. The bitmap may include a set of bits. Each bit of the bitmap is associated with a corresponding VPID field of a VMCS. The processor may provide a control circuit to identify an attempt to change the VPID and, based on the attempt, change the corresponding bit in the bitmap. Thus, an attempt by a processor to write to a VPID to the VPID triggers a VM exit. Level-0 VMM 302 may, using the bitmap, trap the VMWRITE attempt to access the VPID field in the VMCS by non-root VMM 304 and determine the value of the newly generated VPID. In another embodiment, whenever Level-1 VMMs 304 launches a Level-2 guest VM (or Level-2 VMMs) using a VMRESUME (or VMLAUNCH) instruction, a VM exit event is triggered. Before executing VMRESUME (or VMLAUNCH), Level-0 VMM 302 may check the VPIDs of Level-2 guest VMs and Level-2 VMMs to determine if there is duplicated VPIDs.

Figure 4:
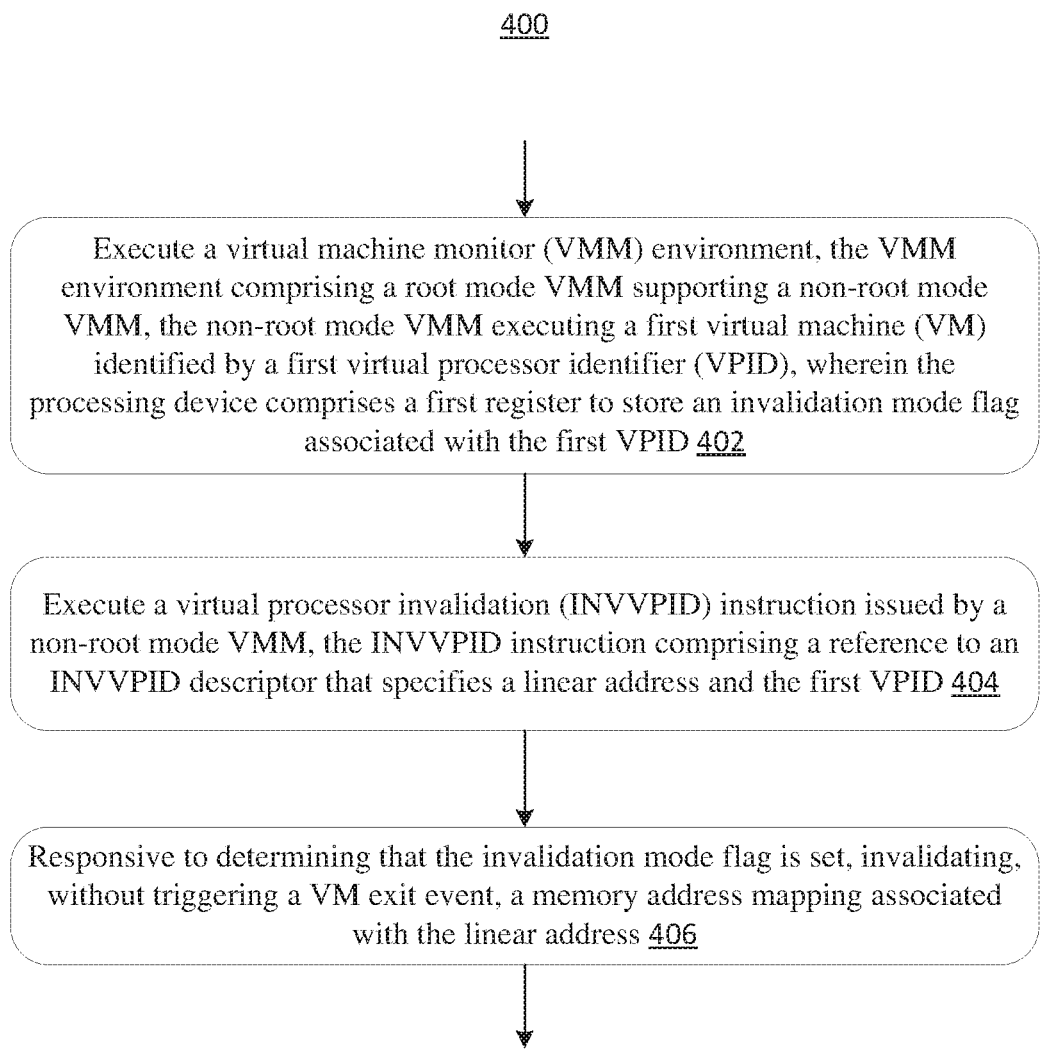
FIG. 4 is a block diagram of a method to execute an INVVPID instruction according to an embodiment of the present disclosure.

FIG. 4 is a block diagram of a method 400 to execute an INVVPID instruction according to an embodiment of the present disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processor 102 and SoC 100 as shown in FIG. 1.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, at 402, processor 102 may execute a virtual machine monitor (VMM) environment, the VMM environment comprising a root mode VMM supporting a non-root mode VMM, the non-root mode VMM executing a first virtual machine (VM) identified by a first virtual processor identifier (VPID), wherein the processing device comprises a first register to store an invalidation mode flag associated with the first VPID.

At 404, responsive to executing the first instruction, processor 102 may execute a virtual processor invalidation (INVVPID) instruction issued by a non-root mode VMM, the INVVPID instruction comprising a reference to an INVVPID descriptor that specifies a linear address and the first VPID.

At 406, responsive to determining that the invalidation mode flag is set, processor 102 may invalidate a memory address mapping associated with the linear address without triggering a VM exit event.

Figure 5:
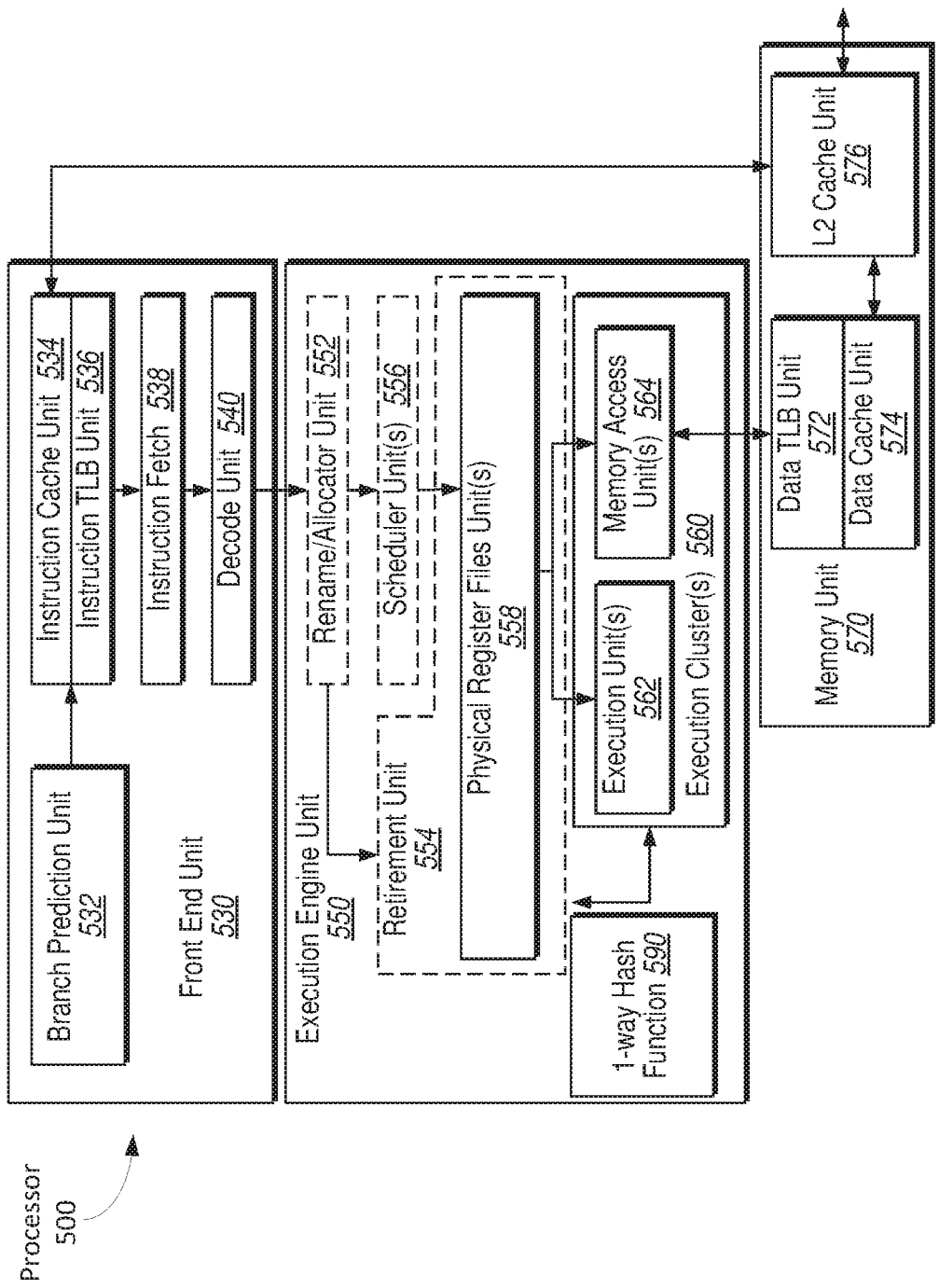
FIG. 5 is a block diagram illustrating a micro-architecture for a processor including heterogeneous core in which one embodiment of the disclosure may be used.

FIG. 5 is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as processor 102 described with respect to FIG. 1. In particular, processor 500 may include the logic circuit 110 that further comprising the invalidation circuit implementing the INVVPID instruction 126 as shown in FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler nit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 14:
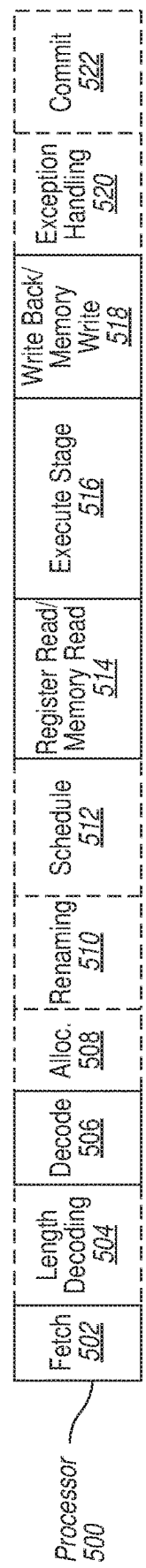
FIG. 14 is a block diagram illustrating an in-order pipeline and a register renaming stage, out-of-order issue/execution pipeline implemented according to at least one embodiment of the disclosure.

FIG. 14 is a block diagram illustrating an in-order pipeline and a register renaming stage, out-of-order issue/execution pipeline implemented by processor 500 of FIG. 5 according to some embodiments of the disclosure. The solid lined boxes in FIG. 14 illustrate an in-order pipeline, while the dashed lined boxes illustrates a register renaming, out-of-order issue/execution pipeline. In FIG. 14, a processor 500 as a pipeline includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 14.

FIG. 6 illustrates a block diagram of the micro-architecture for a processor 600 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMXTM registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
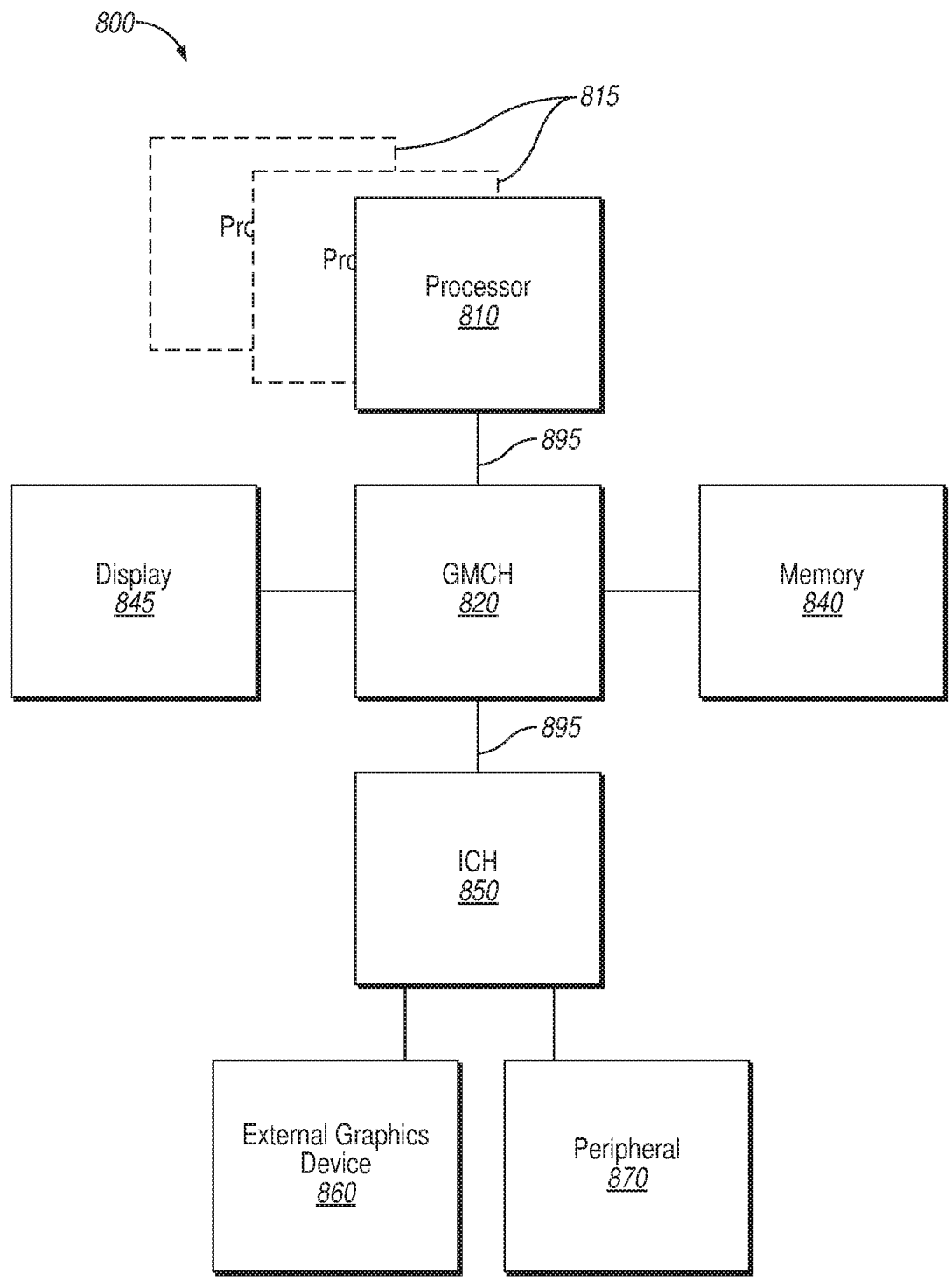
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
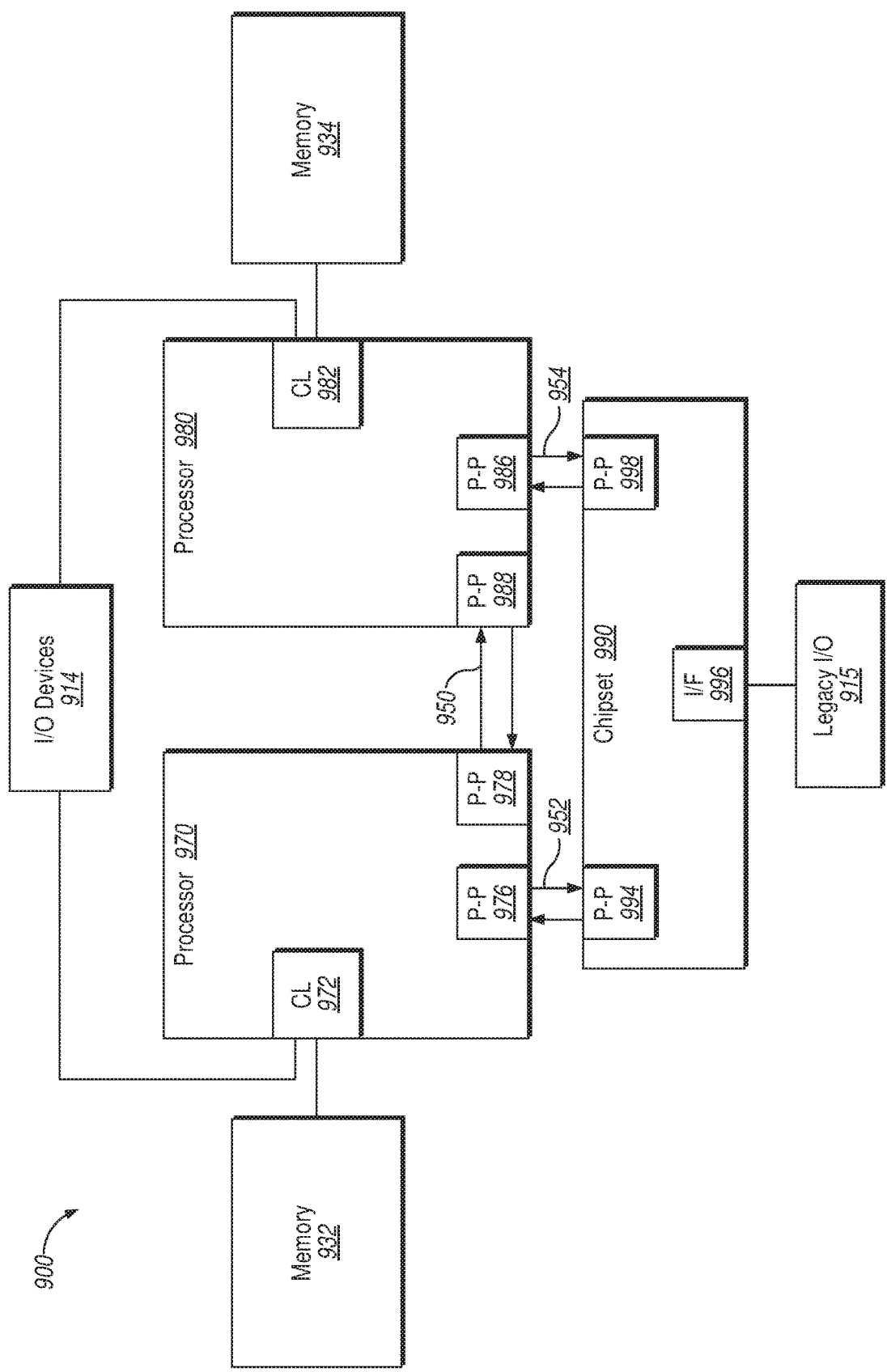
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
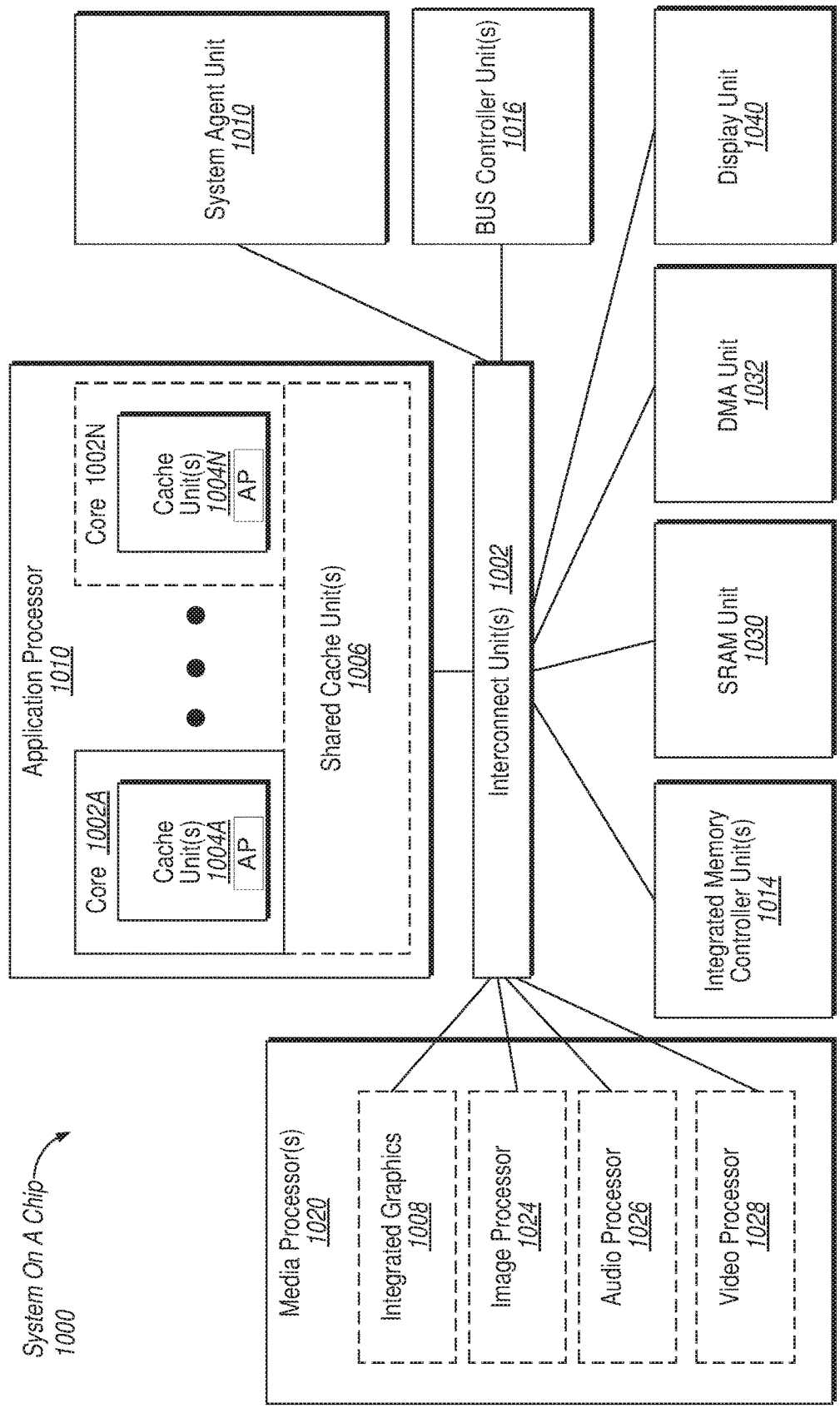
FIG. 10 is a block diagram of a System-on-a-Chip (SoC) in accordance with an embodiment of the present disclosure.

Embodiments may be implemented in many different system types. FIG. 10 is a block diagram of a SoC 1000 in accordance with an embodiment of the present disclosure. Dashed lined boxes are optional features on more advanced SoCs. In some implementations, SoC 1000 as shown in FIG. 10 includes features of the SoC 100 as shown in FIG. 1. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
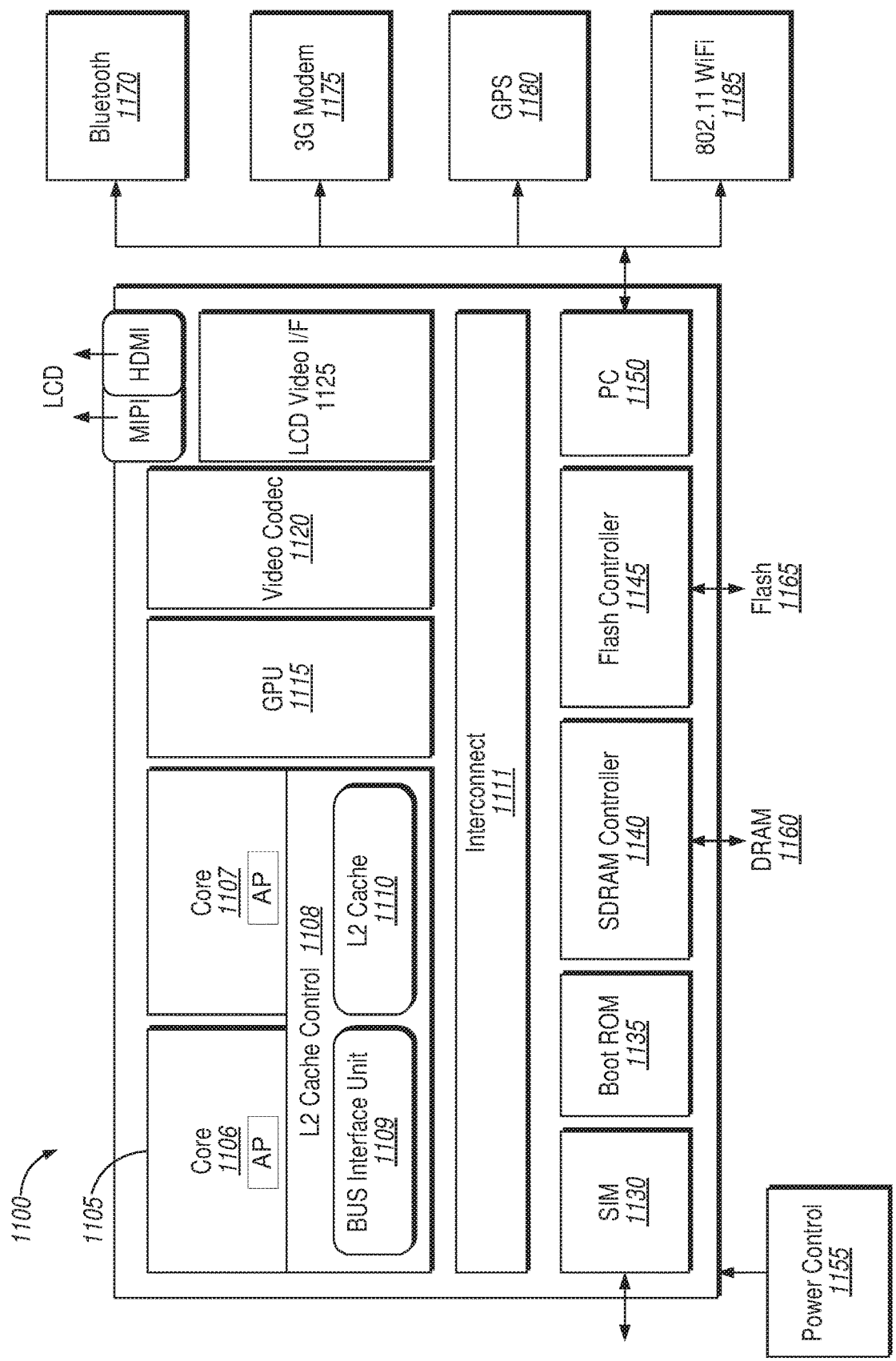
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
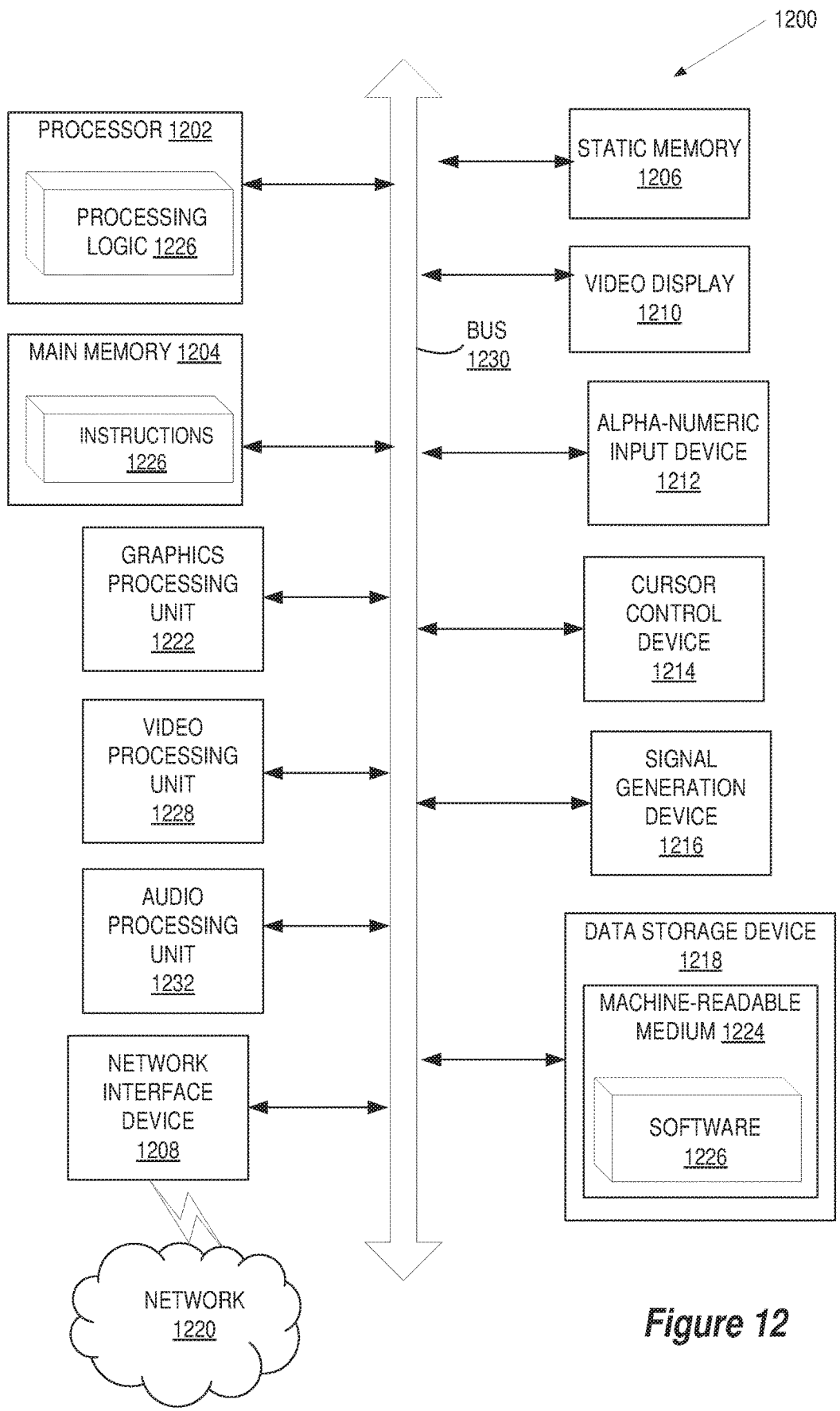
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or more processing cores. The processing device 1202 is configured to execute the processing logic 1226 for performing the operations and steps discussed herein. For example, processing logic 1226 may perform operations as described in FIG. 4. In one embodiment, processing device 1202 is the same as processor architecture 100 described with respect to FIG. 1 as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processor including a first register to store an invalidation mode flag associated with a virtual processor identifier (VPID) and a processing core, communicatively coupled to the first register, the processing core comprising a logic circuit to execute a virtual machine monitor (VMM) environment, the VMM environment comprising a root mode VMM supporting a non-root mode VMM, the non-root mode VMM to execute a virtual machine (VM) identified by the VPID, the logic circuit further comprising an invalidation circuit to execute a virtual processor invalidation (INVVPID) instruction issued by the non-root mode VMM, the INVVPID instruction comprising a reference to an INVVPID descriptor that specifies a linear address and the VPID and responsive to determining that the invalidation mode flag is enabled, invalidate, without triggering a VM exit event, a memory address mapping associated with the linear address.

In Example 2, the subject matter of Example 1 can further provide that wherein the memory address mapping is one of a linear mapping or a combined mapping, wherein the linear mapping translates the linear address associated with a guest application executed by the virtual machine to a host physical address (HPA) associated with a memory, and wherein the combined mapping comprises a first translation from the linear address to a guest physical address (GPA) associated with the VM and a second translation from the GPA to the HPA.

In Example 3, the subject matter of any of Examples 1 and 2 can optionally further include a memory management unit (MMU), wherein the MMU is to translate, using an extended page table (EPT), the GPA to the HPA, and wherein the EPT comprises the VPID and the second translation from the GPA to the HPA of the combined mapping.

In Example 4, the subject matter of any of Examples 1 and 2 can provide that the processing core further comprises a translation lookaside buffer (TLB) to, responsive to performing the memory address mapping, store a cached copy the memory address mapping.

In Example 5, the subject matter of any of Examples 1 and 2 can provide that responsive to determining that the invalidation mode flag is not set, the invalidation circuit is to trigger the VM exit event, and flush all TLB entries except for TLB entries associated with the root-mode VMM.

In Example 6, the subject matter of any of Example 1 can optionally further include a second register to store an invalidation type, wherein the invalidation type is one of an individual-address invalidation, a single-context invalidation, all-context invalidation, or a single-context-retaining-global invalidation, wherein responsive to determining that the invalidation mode flag is set, the invalidation circuit is further to determine that the invalidation type is the individual-address invalidation, invalidate the memory address mapping associated with the linear address, and flush the TLB entry corresponding to the invalidated memory address mapping.

In Example 7, the subject matter of any of Examples 1 and 6 can provide that responsive to determining that the invalidation mode flag is set, the invalidation circuit is further to determine that the invalidation type is the single-context invalidation, invalidate all memory address mappings associated with the VPID, and flush all TLB entries corresponding to the invalidated memory address mappings.

In Example 8, the subject matter of any of Examples 1 and 6 can provide that responsive to determining that the invalidation mode flag is set, the invalidation circuit is further to determine that the invalidation type is the all-context invalidation, invalidate all memory address mappings except for memory address mappings associated with the root-mode VMM, and flush all TLB entries corresponding to the invalidated memory address mappings.

In Example 9, the subject matter of any of Examples 1 and 6 can provide that responsive to determining that the invalidation mode flag is set, the invalidation circuit is further to determine that the invalidation type is the single-context-retaining-global invalidation, and invalidate all memory address mappings except for memory address mappings identified as global memory translation.

Example 10 is a system including a memory and a processor, communicatively coupled to the memory, comprising a first register to store an invalidation mode flag associated with a virtual processor identifier (VPID) and a processing core, communicatively coupled to the first register, the processing core comprising a logic circuit to execute a virtual machine monitor (VMM) environment, the VMM environment comprising a root mode VMM supporting a non-root mode VMM, the non-root mode VMM to execute a virtual machine (VM) identified by the VPID, the logic circuit further comprising an invalidation circuit to execute a virtual processor invalidation (INVVPID) instruction issued by the non-root mode VMM, the INVVPID instruction comprising a reference to an INVVPID descriptor that specifies a linear address and the VPID and responsive to determining that the invalidation mode flag is set, invalidate, without triggering a VM exit event, a memory address mapping associated with the linear address.

In Example 11, the subject matter of Example 10 can further provide that the memory address mapping is one of a linear mapping or a combined mapping, wherein the linear mapping translates the linear address associated with a guest application executed by the virtual machine to a host physical address (HPA) associated with a memory, and wherein the combined mapping comprises a first translation from the linear address to a guest physical address (GPA) associated with the VM and a second translation from the GPA to the HPA.

In Example 12, the subject matter of any of Examples 10 and 11 can further provide that the processing core further comprises a translation lookaside buffer (TLB) to, responsive to performing the memory address translation by the MMU, store a cached copy the memory address mapping.

In Example 13, the subject matter of Example 12 can further provide that wherein responsive to determining that the invalidation mode flag is not set, the invalidation circuit is to trigger the VM exit event, and flush all TLB entries except for TLB entries associated with the root-mode VMM.

In Example 14, the subject matter of Example 12 can optionally further include a second register to store an invalidation type, wherein the invalidation type is one of an individual-address invalidation, a single-context invalidation, all-context invalidation, or a single-context-retaining-global invalidation, wherein responsive to determining that the invalidation mode flag is set, the invalidation circuit is further to determine that the invalidation type is the individual-address invalidation, invalidate the memory address mapping associated with the linear address, and flush the TLB entry corresponding to the invalidated memory address mapping.

In Example 15, the subject matter of any of Examples 10 and 14 can further provide that responsive to determining that the invalidation mode flag is set, the invalidation circuit is further to determine that the invalidation type is the single-context invalidation, invalidate all memory address mappings associated with the VPID, and flush all TLB entries corresponding to the invalidated memory address mappings.

In Example 16, the subject matter of any of Examples 10 and 14 can further provide that responsive to determining that the invalidation mode flag is set, the invalidation circuit is further to determine that the invalidation type is the all-context invalidation, invalidate all memory address mappings except for memory address mappings associated with the root-mode VMM, and flush all TLB entries corresponding to the invalidated memory address mappings.

In Example 17, the subject matter of any of Examples 10 and 14 can further provide that responsive to determining that the invalidation mode flag is set, the invalidation circuit is further to determine that the invalidation type is the single-context-retaining-global invalidation, and invalidate all memory address mappings except for memory address mappings identified as global memory translation.

Example 18 is a method including executing, by a processing device, a virtual machine monitor (VMM) environment, the VMM environment comprising a root mode VMM supporting a non-root mode VMM, the non-root mode VMM executing a first virtual machine (VM) identified by a first virtual processor identifier (VPID), wherein the processing device comprises a first register to store an invalidation mode flag associated with the first VPID, executing a virtual processor invalidation (INVVPID) instruction issued by a non-root mode VMM, the INVVPID instruction comprising a reference to an INVVPID descriptor that specifies a linear address and the first VPID, and responsive to determining that the invalidation mode flag is set, invalidating, without triggering a VM exit event, a memory address mapping associated with the linear address.

In Example 19, the subject matter of Example 18 can further provide that the memory address mapping is one of a linear mapping or a combined mapping, wherein the linear mapping translates the linear address associated with a guest application executed by the virtual machine to a host physical address (HPA) associated with a memory, and wherein the combined mapping comprises a first translation from the linear address to a guest physical address (GPA) associated with the VM and a second translation from the GPA to the HPA.

In Example 20, the subject matter of any of Examples 18 and 19 can further provide that the processing device further comprises a second register to store an invalidation type, wherein the invalidation type is one of an individual-address invalidation, a single-context invalidation, all-context-invalidation, or a single-context-retaining-global invalidation, and a translation lookaside buffer (TLB) to, responsive to performing the memory address translation by the MMU, store a cached copy the memory address mapping.

In Example 21, the subject matter of Example 20 can optionally further include responsive to determining the invalidation type is the individual-address invalidation, invalidating the memory address mapping associated with the linear address and flushing the TLB entry corresponding to the invalidated memory address mapping, responsive to determining that the invalidation type is the single-context invalidation, invalidating all memory address mappings associated with the VPID and flushing all TLB entries corresponding to the invalidated memory address mappings, responsive to determining that the invalidation type is the all-context invalidation, invalidating all memory address mappings except for memory address mappings associated with the root-mode VMM and flushing all TLB entries corresponding to the invalidated memory address mappings, and responsive to determining that the invalidation type is the single-context-retaining-global invalidation, invalidating all memory address mappings except for memory address mappings identified as global memory translation.

In Example 22, the subject matter of Example 20 can optionally further include detecting that the non-root mode VMM assigns a second VPID to a second VM, determining that the second VPID is a duplicate of a third VPID associated with a guest application previously generated by the root mode VMM, executing a second INVVPID instruction to invalidate all memory address mappings associated with the third VPID, and assigning a fourth VPID to the guest application, wherein the fourth VPID is different from the second VPID.

Example 24 is a machine-readable non-transitory medium having stored thereon program code that, when executed, perform operations comprising executing, by the processing device, a virtual machine monitor (VMM) environment, the VMM environment comprising a root mode VMM supporting a non-root mode VMM, the non-root mode VMM executing a first virtual machine (VM) identified by a first virtual processor identifier (VPID), wherein the processing device comprises a first register to store an invalidation mode flag associated with the first VPID, executing a virtual processor invalidation (INVVPID) instruction issued by a non-root mode VMM, the INVVPID instruction comprising a reference to an INVVPID descriptor that specifies a linear address and the first VPID, and responsive to determining that the invalidation mode flag is set, invalidating, without triggering a VM exit event, a memory address mapping associated with the linear address.

In Example 25, the subject matter of Example 24 can further provide that memory address mapping is one of a linear mapping or a combined mapping, wherein the linear mapping translates the linear address associated with a guest application executed by the virtual machine to a host physical address (HPA) associated with a memory, and wherein the combined mapping comprises a first translation from the linear address to a guest physical address (GPA) associated with the VM and a second translation from the GPA to the HPA.

In Example 26, the subject matter of any of Examples 24 and 25 can further provide that the processing device further comprises a second register to store an invalidation type, wherein the invalidation type is one of an individual-address invalidation, a single-context invalidation, all-context-invalidation, or a single-context-retaining-global invalidation, and a translation lookaside buffer (TLB) to, responsive to performing the memory address translation by the MMU, store a cached copy the memory address mapping.

In Example 27, the subject matter of Example 24 can further provide that the operations further comprise include responsive to determining the invalidation type is the individual-address invalidation, invalidating the memory address mapping associated with the linear address and flushing the TLB entry corresponding to the invalidated memory address mapping, responsive to determining that the invalidation type is the single-context invalidation, invalidating all memory address mappings associated with the VPID and flushing all TLB entries corresponding to the invalidated memory address mappings, responsive to determining that the invalidation type is the all-context invalidation, invalidating all memory address mappings except for memory address mappings associated with the root-mode VMM and flushing all TLB entries corresponding to the invalidated memory address mappings, and responsive to determining that the invalidation type is the single-context-retaining-global invalidation, invalidating all memory address mappings except for memory address mappings identified as global memory translation.

In Example 28, the subject matter of Example 24 can further provide that the operations further comprise executing, by the processing device, a virtual machine monitor (VMM) environment, the VMM environment comprising a root mode VMM supporting a non-root mode VMM, the non-root mode VMM executing a first virtual machine (VM) identified by a first virtual processor identifier (VPID), wherein the processing device comprises a first register to store a flag associated with the first VPID, identifying a virtual processor invalidation (INVVPID) instruction issued by a non-root mode VMM, the INVVPID instruction comprising a reference to an INVVPID descriptor that specifies a linear address and the first VPID, and responsive to determining that the flag is set, invalidating, without triggering a VM exit event, a memory address mapping associated with the linear address.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the microcontroller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of 'to,' 'capable of/to,' and/or 'operable to,' in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing system, comprising:
a first register to store an invalidation mode flag associated with a virtual processor identifier (VPID); and
a processing core, communicatively coupled to the first register, the processing core comprising a logic circuit to execute a virtual machine monitor (VMM) environment, the VMM environment comprising a root mode VMM supporting a non-root mode VMM, the non-root mode VMM to execute a virtual machine (VM) identified by the VPID, the logic circuit further comprising an invalidation circuit to:
execute a virtual processor invalidation (INVVPID) instruction issued by the non-root mode VMM, the INVVPID instruction comprising a reference to an INVVPID descriptor that specifies a linear address and the VPID; and
responsive to determining that the invalidation mode flag is set, invalidate, without triggering a VM exit event, a memory address mapping associated with the linear address.

2. The processing system of claim 1, wherein the memory address mapping is one of a linear mapping or a combined mapping,
wherein the linear mapping translates the linear address associated with a guest application executed by the virtual machine (VM) to a host physical address (HPA) associated with a memory, and
wherein the combined mapping comprises a first translation from the linear address to a guest physical address (GPA) associated with the VM and a second translation from the GPA to the HPA.

3. The processing system of claim 2, further comprising a memory management unit (MMU), wherein the MMU is to translate, using an extended page table (EPT), the GPA to the HPA, and wherein the EPT comprises the VPID and the second translation from the GPA to the HPA of the combined mapping.

4. The processing system of claim 1 wherein the processing core further comprises:
a translation lookaside buffer (TLB) to, responsive to performing the memory address mapping, store a cached copy the memory address mapping.

5. The processing system of claim 4, wherein responsive to determining that the invalidation mode flag is not set, the invalidation circuit is to:
trigger the VM exit event; and
flush all TLB entries except for the TLB entries associated with the root mode VMM.

6. The processing system of claim 1, further comprising:
a second register to store an invalidation type, wherein the invalidation type is one of an individual-address invalidation, a single-context invalidation, all-context invalidation, or a single-context-retaining-global invalidation, wherein responsive to determining that the invalidation mode flag is set, the invalidation circuit is further to:
determine that the invalidation type is the individual-address invalidation;
invalidate the memory address mapping associated with the linear address; and
flush the TLB entry corresponding to the invalidated memory address mapping.

7. The processing system of claim 6, wherein responsive to determining that the invalidation mode flag is set, the invalidation circuit is further to:
determine that the invalidation type is the single-context invalidation;

invalidate all memory address mappings associated with the VPID; and flush all the TLB entries corresponding to the invalidated memory address mappings.

8. The processing system of claim 6, wherein responsive to determining that the invalidation mode flag is set, the invalidation circuit is further to:

determine that the invalidation type is the all-context invalidation;

invalidate all memory address mappings except for memory address mappings associated with the root mode VMM; and flush all TLB entries corresponding to the invalidated memory address mappings.

9. The processing system of claim 6, wherein responsive to determining that the invalidation mode flag is set, the logic circuit is further to:

determine that the invalidation type is the single-context-retaining-global invalidation; and invalidate all memory address mappings except for memory address mappings identified as global memory translation.

10. A system comprising:

a memory; and a processor, communicatively coupled to the memory, comprising:

a first register to store an invalidation mode flag associated with a virtual processor identifier (VPID); and a processing core, communicatively coupled to the first register, the processing core comprising a logic circuit to execute a virtual machine monitor (VMM) environment, the VMM environment comprising a root mode VMM supporting a non-root mode VMM, the non-root mode VMM to execute a virtual machine (VM) identified by the VPID, the logic circuit further comprising an invalidation circuit to:

execute a virtual processor invalidation (INVVPID) instruction issued by the non-root mode VMM, the INVVPID instruction comprising a reference to an INVVPID descriptor that specifies a linear address and the VPID; and responsive to determining that the invalidation mode flag is set, invalidate, without triggering a VM exit event, a memory address mapping associated with the linear address.

11. The system of claim 10, wherein the memory address mapping is one of a linear mapping or a combined mapping, wherein the linear mapping translates the linear address associated with a guest application executed by the virtual machine (VM) to a host physical address (HPA) associated with a memory, and wherein the combined mapping comprises a first translation from the linear address to a guest physical address (GPA) associated with the VM and a second translation from the GPA to the HPA.

12. The system of claim 11, wherein the processing core further comprises:

a translation lookaside buffer (TLB) to, responsive to performing the memory address translation, store a cached copy the memory address mapping.

13. The system of claim 12, wherein responsive to determining that the invalidation mode flag is not set, the invalidation circuit is to:

trigger the VM exit event; and flush all TLB entries except for the TLB entries associated with the root mode VMM.

14. The system of claim 10, further comprising:

a second register to store an invalidation type, wherein the invalidation type is one of an individual-address invalidation, a single-context invalidation, all-context invalidation, or a single-context-retaining-global invalidation, wherein responsive to determining that the invalidation mode flag is set, the invalidation circuit is further to:

determine that the invalidation type is the individual-address invalidation;

invalidate the memory address mapping associated with the linear address; and flush the TLB entry corresponding to the invalidated memory address mapping.

15. The system of claim 14, wherein responsive to determining that the invalidation mode flag is set, the invalidation circuit is further to:

determine that the invalidation type is the single-context invalidation;

invalidate all memory address mappings associated with the VPID; and flush all the TLB entries corresponding to the invalidated memory address mappings.

16. The system of claim 14, wherein responsive to determining that the invalidation mode flag is set, the invalidation circuit is further to:

determine that the invalidation type is the all-context invalidation;

invalidate all memory address mappings except for memory address mappings associated with the root mode VMM; and flush all TLB entries corresponding to the invalidated memory address mappings.

17. The system of claim 14, wherein responsive to determining that the invalidation mode flag is set, the invalidation circuit is further to:

determine that the invalidation type is the single-context-retaining-global invalidation; and invalidate all memory address mappings except for memory address mappings identified as global memory translation.

18. A method comprising:

executing, by a processing device, a virtual machine monitor (VMM) environment, the VMM environment comprising a root mode VMM supporting a non-root mode VMM, the non-root mode VMM executing a first virtual machine (VM) identified by a first virtual processor identifier (VPID), wherein the processing device comprises a first register to store an invalidation mode flag associated with the first VPID;

executing a virtual processor invalidation (INVVPID) instruction issued by a non-root mode VMM, the INVVPID instruction comprising a reference to an INVVPID descriptor that specifies a linear address and the first VPID; and responsive to determining that the invalidation mode flag is set, invalidating, without triggering a VM exit event, a memory address mapping associated with the linear address.

19. The method of claim 18, wherein the memory address mapping is one of a linear mapping or a combined mapping, wherein the linear mapping translates the linear address associated with a guest application executed by the virtual machine (VM) to a host physical address (HPA) associated with a memory, and wherein the combined mapping comprises a first translation from the linear address to a guest physical address (GPA) associated with the VM and a second translation from the GPA to the HPA.

20. The method of claim 19, wherein the processing device further comprises:
   a second register to store an invalidation type, wherein the invalidation type is one of an individual-address invalidation, a single-context invalidation, all-context-invalidation, or a single-context-retaining-global invalidation; and
   a translation lookaside buffer (TLB) to, responsive to performing the memory address translation, store a cached copy the memory address mapping.

21. The method of claim 20, further comprising:
   responsive to determining the invalidation type is the individual-address invalidation,
      invalidating the memory address mapping associated with the linear address; and
      flushing the TLB entry corresponding to the invalidated memory address mapping;
   responsive to determining that the invalidation type is the single-context invalidation,
      invalidating all memory address mappings associated with the VPID; and
      flushing all the TLB entries corresponding to the invalidated memory address mappings;
   responsive to determining that the invalidation type is the all-context invalidation,
      invalidating all memory address mappings except for memory address mappings associated with the root mode VMM; and
      flushing all the TLB entries corresponding to the invalidated memory address mappings; and
   responsive to determining that the invalidation type is the single-context-retaining-global invalidation, invalidating all memory address mappings except for memory address mappings identified as global memory translation.

22. The method of claim 20, further comprising:
   detecting that the non-root mode VMM assigns a second VPID to a second VM;
   determining that the second VPID is a duplicate of a third VPID associated with a guest application previously generated by the root mode VMM;
   executing a second INVVPID instruction to invalidate all memory address mappings associated with the third VPID; and
   assigning a fourth VPID to the guest application, wherein the fourth VPID is different from the second VPID.

* * * * *